United States Patent [19]

Reade

[11] 4,198,466
[45] Apr. 15, 1980

[54] GLASSES AND GLASS-CERAMICS WITH METAL ALLOY SURFACES

[75] Inventor: Richard F. Reade, Corning, N.Y.

[73] Assignee: Corning Glass Works, N.Y.

[21] Appl. No.: 946,808

[22] Filed: Sep. 28, 1978

[51] Int. Cl.$^2$ .............................................. B32B 17/06
[52] U.S. Cl. ................... 428/410; 428/432; 428/433; 428/539; 428/900
[58] Field of Search ............... 428/410, 432, 433, 900, 428/539

[56] References Cited

U.S. PATENT DOCUMENTS

| | | | |
|---|---|---|---|
| 2,920,971 | 11/1960 | Stookey | 106/39.7 |
| 3,940,531 | 2/1976 | Demarest | 428/432 |
| 3,962,514 | 6/1976 | Rittler | 106/39.8 |
| 4,059,454 | 11/1977 | Reade | 106/39.8 |
| 4,083,709 | 4/1978 | Reade | 65/33 |

*Primary Examiner*—Ellis P. Robinson
*Attorney, Agent, or Firm*—Clinton S. Janes, Jr.

[57] ABSTRACT

The subject invention is drawn to the production of composite glass articles having base compositions within the $Li_2O$ and/or $Na_2O$-FeO-CoO and/or NiO-$Al_2O_3$-$SiO_2$ system and glass-ceramic articles having base compositions within the $Li_2O$-FeO-CoO and/or NiO-$Al_2O_3$-$SiO_2$ system wherein the articles have a thin, integral, tightly-bonded surface layer containing crystals of nickel-iron, cobalt-iron, or cobalt-nickel-iron alloy.

3 Claims, No Drawings

GLASSES AND GLASS-CERAMICS WITH METAL ALLOY SURFACES

BACKGROUND OF THE INVENTION

U.S. Pat. No. 4,083,709 discloses the production of glass-ceramic articles having integral surface layers exhibiting ferrimagnetic properties wherein the interior portion thereof consists essentially of beta-spodumene solid solution crystals dispersed within a glassy matrix and the surface layer consists essentially of $CoFe_2O_4$ and/or $NiFe_2O_4$ crystallites dispersed within a glassy matrix. Such articles are prepared by melting a predetermined batch in the $Li_2O\text{-}Al_2O_3\text{-}Fe_2O_3\text{-}NiO$ and/or $CoO\text{-}SiO_2\text{-}TiO_2$ composition field, simultaneously cooling the melt and shaping a glass article therefrom, and then exposing the glass article in an oxidizing atmosphere to temperatures between 900°–1300° C. to effect the growth in situ of the desired beta-spodumene solid solution crystals in the body portion of the article and of $CoFe_2O_4$ and/or $NiFe_2O_4$ crystallites in the integral surface layer.

U.S. Application Ser. No. 946,809, filed concurrently herewith by the present applicant, describes the production of composite glass articles having a glassy interior portion and a thin, integral surface layer containing $CoFe_2O_4$, $NiFe_2O_4$, and $(Co,Ni)Fe_2O_4$ crystallites demonstrating ferrimagnetic properties. Such articles are prepared by melting a proper batch selected from the $Li_2O$ and/or $Na_2O\text{-}FeO\text{-}CoO$ and/or $NiO\text{-}Al_2O_3\text{-}SiO_2$ composition field, simultaneously cooling the melt and shaping a glass article therefrom, and subsequently exposing the glass article in an oxidizing environment to temperatures between 725°–875° C. to effect the desired in situ growth of $CoFe_2O_4$, $NiFe_2O_4$, and $(Co,Ni)Fe_2O_4$ crystallites in the surface of the article.

U.S. Pat. No. 3,962,514 discusses the manufacture of glass-ceramic articles containing beta-quartz and/or beta-spodumene solid solution as the predominant crystal phase in the interior portion thereof and which have an integral surface layer containing transition metal spinel-type crystals. As illustrative of such spinel-type crystals, the patent reported, among others, $NiAl_2O_4$, $CoAl_2O_4$, $CoFe_2O_4$, and $NiFe_2O_4$.

The base glasses for such articles are stated to reside in the $Al_2O_3\text{-}SiO_2$ and $Al_2O_3\text{-}B_2O_3$ systems with $Li_2O$ or $MnO_2$ as the primary modifying metal oxide. The glasses are nucleated with $TiO_2$ and/or $ZrO_2$. The transition metal oxides are present in amounts between 0.1–10% to form the spinel-type crystals.

The precursor glass articles are crystallized in situ to glass-ceramic articles by heating between 800°–1200° C. Thereafter, the integral surface layer containing spinel-type crystals is developed in situ by firing the glass-ceramic article in a reducing environment at 500°–1000° C. In the preferred practice, the glass-ceramic article is treated in an acid solution prior to firing in a reducing atmosphere.

The preparation of glass-ceramic articles had its genesis in U.S. Pat. No. 2,920,971 and reference is hereby made to that patent for further information regarding the physical properties and internal structures of glass-ceramic articles, as well as the mechanism and temperature parameters involved in the nucleating and crystallization of such articles. The glass-ceramic articles of the instant invention, as described hereinafter, are prepared utilizing the general method described and have a microstructure similar to that described in that disclosure.

OBJECTIVE OF THE INVENTION

The principal objective of the present invention is to provide composite glass and glass-ceramic articles having thin, integral surface layers demonstrating metallic, ferromagnetic properties resulting from the presence of cobalt-iron, nickel-iron, or cobalt-nickel-iron alloy crystals therein.

Another objective of the invention is to provide a method for making such composite glass and glass-ceramic articles.

SUMMARY OF THE INVENTION

I have found that those objectives with respect to glass articles can be accomplished employing base compositions within the $Li_2O$ and/or $Na_2O\text{-}FeO\text{-}CoO$ and/or $NiO\text{-}Al_2O_3\text{-}SiO_2$ field and, where a glass-ceramic article is desired, by including a nucleating agent such as $TiO_2$ with, optionally, $ZrO_2$ in a base composition within the $Li_2O\text{-}FeO\text{-}CoO$ and/or $NiO\text{-}Al_2O_3\text{-}SiO_2$ field.

Thus, the inventive composite glass articles consist of an interior glassy portion and a very thin, highly crystalline, integral surface layer consisting of very fine-grained crystals of cobalt-iron, nickel-iron, or the ternary cobalt-nickel-iron alloy dispersed within a glassy matrix, the surface layer not exceeding several thousand angstroms in thickness and the crystals having diameters less than one micron and, normally, less than 0.5 micron. The glass articles have an overall composition consisting essentially, in weight percent on the oxide basis, of about 1–17% $R_2O$, wherein $R_2O$ consists of $Li_2O$ and/or $Na_2O$ in the following indicated proportions when either is present alone of 2.5–5.5% $Li_2O$ and 1–16% $Na_2O$, 1–3.75% FeO, 0.75–5% RO, wherein RO consists of NiO and/or CoO in the following indicated proportions of 0.75–3% NiO and 0.75–4% CoO, 20–32% $Al_2O_3$, and 50–72% $SiO_2$. Glass formers such as $P_2O_5$ and $B_2O_3$ may be included in amounts of up to 10% $P_2O_5$ and up to 3% $B_2O_3$. Fluoride may also be added to the base composition in quantities up to about 2% as a fluxing agent. The presence of $B_2O_3$ and/or F also appears to be beneficial in promoting the growth of ferrite crystals, viz., $CoFe_2O_4$, $NiFe_2O_4$, and composite $(Co,Ni)Fe_2O_4$. $As_2O_3$ will customarily be included to perform its conventional function as a fining agent. The preferred compositions will consist essentially solely of $Li_2O$ and/or $Na_2O$, FeO, CoO and/or NiO, $Al_2O_3$, and $SiO_2$ with, optionally, $P_2O_5$, $B_2O_3$, and/or F. The common nucleating agents such as $TiO_2$, $SnO_2$, and $ZrO_2$ will desirably be absent from the compositions in order to enhance the low temperature development of ferrite crystallites in the surface and to inhibit the growth in situ of internal crystallization.

The inventive composite glass-ceramic articles consist of a highly crystalline, interior portion consisting essentially of beta-spodumene solid solution crystals dispersed within a glassy matrix and a very thin, highly crystalline, integral surface layer consisting of very fine-grained crystals of cobalt-iron or nickel-iron alloy dispersed within a glassy matrix, the surface layer not exceeding several thousand angstroms in thickness and the crystals having diameters less than one micron and, normally, less than 0.5 micron.

The glass-ceramic articles have an overall composition consisting essentially, in weight percent on the oxide basis, of about 2.5–5.5% $Li_2O$, 16–27% $Al_2O_3$, 1–4% FeO, 0.5–3% NiO and/or 0.75–4% CoO, the sum of CoO+NiO not exceeding about 5%, 40–75% $SiO_2$, and 1.75–6% $TiO_2$. Up to about 3% $ZrO_2$ may optionally be included to assist nucleation.

Whereas minor amounts of glass-forming oxides such as $B_2O_3$ and $P_2O_5$, as well as such divalent metal oxides as the alkaline earth metal oxides, PbO, and ZnO, can be tolerated in small amounts to improve the melting and forming capabilities of the precursor glass or to modify the final physical properties, the most preferred compositions will consist essentially solely of the above-recited base compositions.

In general, the beta-spodumene solid solutions have compositions within the $Li_2O.Al_2O_3.nSiO_2$ system wherein n will vary between about 3.5–8.

The inventive method for making the composite glass articles contemplates four basic elements:

(1) a glass-forming batch of the proper proportions is melted;

(2) the melt is simultaneously cooled below the transformation range thereof (optionally to room temperature) and a glass article of a desired geometry shaped therefrom;

(3) the glass article is exposed in an oxidizing environment to a temperature between about 725°–875° C. for a sufficient length of time to cause the growth in situ of $CoFe_2O_4$, $NiFe_2O_4$, or $(Co,Ni)Fe_2O_4$ crystallites in an integral surface layer on the article, thereby producing a composite glass article; and then (4) the composite glass article is subjected to a reducing environment at a temperature between about 500°–800° C. for a sufficient length of time to reduce the $CoFe_2O_4$, $NiFe_2O_4$, or $(Co,Ni)Fe_2O_4$ crystallites to crystals of cobalt-iron, nickel-iron, or cobalt-nickel-iron alloy.

The inventive method for preparing the composite glass-ceramic articles also comprehends four fundamental steps:

(1) a glass-forming batch of the proper proportions is melted;

(2) the melt is simultaneously cooled below the transformation range thereof (optionally to room temperature) and a glass article of a desired geometry shaped therefrom;

(3) the glass article is exposed in an oxidizing environment to a temperature between about 900°–1300° C. for a sufficient length of time to cause the growth in situ of $CoFe_2O_4$, $NiFe_2O_4$, or $(Co,Ni)Fe_2O_4$ crystallites in an integral surface layer on the article and the growth in situ of crystals of beta-spodumene solid solution in the body portion of the article, thereby producing a composite glass-ceramic article; and then (4) the composite glass-ceramic article is subjected to a reducing environment at a temperature between about 500°–800° C. for a sufficient length of time to reduce the $CoFe_2O_4$, $NiFe_2O_4$, or $(Co,Ni)Fe_2O_4$ crystallites to crystals of cobalt-iron, nickel-iron, or cobalt-nickel-iron alloy.

The alloy layers are continuous over the surface of the glass and glass-ceramic articles and provide electrical conduction over a wide range of values depending upon precursor glass composition, heat treatment, and surface conditions; these values, however, being well within the range commonly associated with metallic conductors. Also, because of this continuity of the surface layer, the products can be efficient solar selective absorbers for solar energy applications.

Because crystal growth in situ is well-known to contemplate a time-temperature relationship, extensive crystallization will demand longer exposures to temperatures at the cooler extreme of the crystallization range than at the upper end thereof. For example, in the formation of the $CoFe_2O_4$, $NiFe_2O_4$, or $(Co,Ni)Fe_2O_4$ crystallites in the surface of the glass articles, exposures of only about 1–2 hours may be necessary at the higher end of the crystallization temperature interval, whereas up to 24 hours and longer may be required at the lower temperatures of the effective range. Likewise, in the growth of beta-spodumene solid solution crystals concomitantly with the development of $CoFe_2O_4$, $NiFe_2O_4$, or $(Co,Ni)Fe_2O_4$ crystals in the surface layer of the glass-ceramic article, longer exposure periods will be demanded at temperatures approaching 900° C. than at temperatures in the higher extreme of the range. It is quite customary to develop the crystallization present in the glass-ceramic articles via two general steps; viz., a nucleation heat treatment at temperatures somewhat above the transformation range, i.e., at temperatures about 750°–850° C. for about 1–6 hours, followed by the crystallization treatment at 900°–1300° C. for about 3–12 hours.

In general, reduction of the $CoFe_2O_4$, $NiFe_2O_4$, or $(Co,Ni)Fe_2O_4$ crystallites to crystals of cobalt-iron, nickel-iron, or cobalt-nickel-iron alloy will be achieved after about 2–8 hours' exposure to a reducing environment at temperatures within the 500°–800° C. interval. Longer periods of exposure do not appear to adversely affect the electrical and magnetic properties of the final product, but neither do such seem to lend any significant advantage. Customarily, after the treatment in the reducing environment has been concluded, the composite glass-ceramic article will be cooled to room temperature while in the presence of a reducing environment.

It has been learned that the electrical and magnetic properties exhibited by the final product can often be significantly enhanced when the surface layer of the afore-mentioned $CoFe_2O_4$, $NiFe_2O_4$, or $(Co,Ni)Fe_2O_4$ crystallites is contacted with a hot mineral acid prior to subjecting the composite glass or glass-ceramic articles to the reducing environment. Accordingly, such contact constitutes the most desired practice of the invention. Hydrochloric acid, sulfuric acid, phosphoric acid, and nitric acid have been found operable for the purpose with nitric acid being preferred since the other three acids demonstrate some tendency to attack the ferrite surface, so must be utilized with caution.

DESCRIPTION OF PREFERRED EMBODIMENTS

Table I reports several approximate glass compositions, expressed in terms of parts by weight on the oxide basis, illustrating the parameters of the instant invention where either $CoFe_2O_4$ or $NiFe_2O_4$ ferrite is produced. Compositions leading to the formation of $(Co,Ni)Fe_2O_4$ and the ternary cobalt-nickel-iron alloys are recorded in Table III, infra, and will be discussed hereinbelow. Because it is not known with which cation(s) the fluoride is combined, it is simply stated in the form of $AlF_3$, the batch material by which the fluoride was added. Moreover, inasmuch as the sum of the individual ingredients equals or closely approaches 100, for all practical purposes the compositions may be considered to have been reported in terms of weight percent. Finally, the actual batch components can comprise any material, either the oxide or other compound, which, when melted together with the other constituents, will be converted into the desired oxide in the proper proportion.

The batch ingredients were compounded in an amount to yield about 1000 grams. The batches were ballmilled to aid in securing a homogeneous melt and then placed into platinum crucibles. The crucibles were covered, moved to a furnace operating at 1550°–1650° C., and the batches melted for about 16 hours with stirring. The melts were thereafter poured into slabs having dimensions about 10"×1"×0.25" and those slabs immediately transferred to an annealer operating at 400°–650° C. A brief dwell period at the higher annealing temperature was commonly utilized to relieve strain in the glass and avoid surface devitrification.

$As_2O_3$ was added to the several base compositions to function in its customary capacity as a fining agent.

TABLE I

| | 1 | 2 | 3 | 4 | 5 | 6 | 7 | 8 | 9 |
|---|---|---|---|---|---|---|---|---|---|
| $SiO_2$ | 64.3 | 51.3 | 50.6 | 51.3 | 50.9 | 68.7 | 62.9 | 59.5 | 67.6 |
| $Al_2O_3$ | 21.1 | 30.0 | 27.7 | 30.0 | 26.4 | 21.9 | 20.7 | 26.1 | 20.2 |
| $Li_2O$ | 5.1 | — | — | — | — | 4.1 | 2.7 | 5.4 | 4.1 |
| $Na_2O$ | — | 15.3 | 15.1 | 14.1 | 13.8 | — | — | — | — |
| FeO | 2.1 | 1.8 | 1.8 | 2.7 | 1.9 | 3.0 | 1.9 | 2.4 | 2.7 |
| CoO | 1.1 | 0.9 | 0.9 | 1.4 | — | — | — | — | — |
| NiO | — | — | — | — | 1.0 | 2.1 | 2.0 | 2.5 | 0.9 |
| $TiO_2$ | 3.4 | — | — | — | — | — | 2.1 | 3.5 | 4.0 |
| $As_2O_3$ | 0.6 | 0.8 | 0.7 | 0.4 | 0.7 | 0.3 | 0.3 | 0.7 | 0.5 |
| $AlF_3$ | 2.4 | — | 3.1 | — | 2.9 | — | — | — | — |
| $B_2O_3$ | — | — | — | — | 2.4 | — | — | — | — |
| $P_2O_5$ | — | — | — | — | — | — | 7.4 | — | — |

In these laboratory examples, the glass slabs were annealed to room temperature to enable inspection of glass quality and to allow sawing of the bodies into test samples. That practice is not necessary for the successful operation of the subject invention, but the glass articles must be cooled to a temperature below the transformation range thereof before being heat treated in order to insure the development in situ of fine-grained surface crystallization with or without fine-grained body crystallization. The transformation range has been defined as that temperature at which a liquid melt is converted into an amorphous solid, that temperature being considered to lie in the vicinity of the annealing point of the glass.

Table II sets forth several heat treatment schedules in an air atmosphere to which glass articles prepared from the exemplary compositions of Table I were exposed to convert them to composite glass and glass-ceramic articles having very thin, integral surface layers containing crystallites of $CoFe_2O_4$ or $NiFe_2O_4$. It will be appreciated that the rates at which the articles were heated to the cited temperatures are illustrative only and must not be deemed limitative. The rates of heating are guided by the desire to avoid cracking or breaking caused by thermal shock and, at temperatures approaching and exceeding the softening point of the glass where a glass-ceramic is being produced, to avoid deformation of the article due to incomplete crystal growth. Likewise, the heat treating temperature utilized is a matter of empirical choice and must not be considered limitative. The determination of suitable heat treating schedules is well within the technical ingenuity of the worker of ordinary skill in the art.

Table II also reports several treatments in reducing environments which were applied to the composite glass and glass-ceramic articles to transform the $CoFe_2O_4$ or $NiFe_2O_4$ crystallites to cobalt-iron or nickel-iron alloy. Various gaseous atmospheres are suitable as reducing environments, the most useful being hydrogen and mixtures of hydrogen and nitrogen. In the examples recorded in Table II dry forming gas, i.e., 92% by volume nitrogen and 8% by volume hydrogen, constituted the reducing gaseous atmosphere. This mixture of gases is especially preferred because it does not present the safety hazards encountered with hydrogen alone and is relatively inexpensive. After baking at elevated temperatures and purging a heated furance tube with dry forming gas to remove any tramp gas therefrom, the specimens reported in Table II were exposed to a flow rate of the gas of about 100 cc/minute.

A treatment of at least about two hours at 500°–800° C. in the forming gas environment appears necessary to secure essentially complete conversion of the ferrite crystals to alloy. Exposures longer than about eight hours can be utilized but with no apparent improvement in crystal microstructure or physical properties exhibited. Therefore, an exposure of eight hours is deemed to comprise a practical maximum period.

Whereas not mandatory, the electrical and magnetic properties of the alloy surfaces appear to be improved where the ferrite surface layers are contacted with a mineral acid such as nitric acid, hydrochloric acid, phosphoric acid, or sulfuric acid. This phenomenon is especially apparent in those $Li_2O$-containing glass and glass-ceramic articles. Hot concentrated and dilute nitric acid, dilute sulfuric acid, dilute phosphoric acid, and dilute hydrochloric acid can be operable. Hot concentrated hydrochloric acid, phosphoric acid, and sulfuric acid tend to dissolve the ferrite layer and, hence, must be used with extreme caution, if employed at all. The reaction mechanism by means of which the acid treatment enhances the electrical and magnetic properties of the alloy layer has not been fully elucidated, but the treatment is thought to remove tramp components introduced through manual handling of the samples and/or exposure to the ambient atmosphere. Furthermore, the treatment is believed to insure the removal of any glassy film, commonly less than 100 Å in thickness, at the surface. In the examples tabulated below, boiling concentrated nitric acid was employed since it appeared to significantly improve the electrical and magnetic properties of the final products without seriously degrading other properties of the specimens. Immersions in such acid baths much in excess of two minutes begin to attack the ferrite surfaces, however. The use of dilute acid may be desirable since it can be as effective as the concentrated acid and less care need be taken with its use, because it will not attack the surface layer as rapidly.

The $Na_2O$-containing glass articles are quite sensitive to attack by acids so contact of said glasses with acids must be very brief, if at all. For example, immersions of no more than about two minutes in a concentrated acid bath will initiate visible corrosion of the glass.

Also reported in Table II are the crystal phases present in the interior portion of the glass-ceramic articles as identified through X-ray diffraction analyses. Examination of the surface layers on the glass and glass-ceramic articles having NiO in the composition via X-ray and electron diffraction analyses readily identified the presence of nickel-iron alloy. However, there is no listing for a cobalt-iron alloy in the *Index to the Powder Diffraction File*, 1976 Edition, American Society for Testing Materials. Accordingly, the existence of this alloy was determined empirically in the following manner.

Surfaces from CoO-containing glasses and glass-ceramic articles made in accordance with the inventive method were removed via treatment in boiling concentrated hydrochloric acid and the resultant solutions evaporated to dryness. The presence of cobalt and iron in the residue was confirmed spectrographically. To prove the existence of the cobalt-iron alloy, the material was synthesized by first forming the ferrite and then reducing the ferrite to the alloy in forming gas. Thus, a stoichiometric mixture of $Co_3O_4$ and $Fe_2O_3$ was reacted in air at 1400° C. for 20 hours. An X-ray diffraction pattern of the resulting product revealed only $CoFe_2O_4$ with no unreacted oxides or other impurity phases present. The powdered ferrite was thereafter heated for three hours in forming gas at 525° C. The product was a ferromagnetic, electrically-conducting material with the structure of alpha-iron. That the material contained cobalt and iron atoms was verified analytically. The X-ray diffraction pattern showed only the $CoFe_2$ alloy phase; no ferrite, metallic cobalt, metallic iron, or impurity oxide phase was detected. The diffraction pattern of the synthesized alloy matches that observed for the reduced Co-Fe surfaces on the inventive composite glasses and glass-ceramics.

The remanent flux and coercive force exhibited by the inventive products were measured in the following manner. The composite glass and glass-ceramic articles were magnetized and the magnetic properties determined by applying a strong magnetic field thereto. The strength of the applied field was increased until the test specimen was magnetically saturated. Thereupon, the applied field was reduced to zero and the degree of permanent magnetism of the sample determined in terms of remanent magnetic flux. The coercive force required to demagnetize the specimen was measured through the application of a magnetic field of increasing strength with reverse polarity. Remanent flux is measured in maxwells/cm and coercive force is oersteds.

The optical properties reported in Table II are related to the solar spectrum. Thus:

$\alpha$ = integrated absorptance of solar radiation from 0.3–2.0 microns $\epsilon$ = integrated emittance of thermal radiative heat loss from about 2.5–30 microns The electrical properties listed in Table II include:

$\sigma$ = surface resistivity in ohms/square at 25° C. and 200° C.

TCR = temperature coefficient of resistivity in PPM/°C. for alloy surfaces =

$$\sigma 1/25 - (\sigma 200 - \sigma 25)/175 \times 10^6$$

The treatments recited in Table II were carried out on precursor glass bodies which had been annealed to room temperature to permit examination for glass quality and to allow test samples to be sawed therefrom. It will be appreciated that this cooling to room temperature is not a mandatory step of the invention. It is necessary, however, for the original glass article to be cooled to a temperature below the transformation range of the glass prior to the crystallization heat treatment in order to insure the development of uniformly very fine-grained crystals, both in the interior of the glass-ceramic articles and in the integral surface layers.

Likewise, the use of specific dwell periods at particular temperatures is not demanded. It is only necessary that the articles be exposed to temperatures within the cited effective ranges for a period of time sufficient to generate the desired crystallization.

TABLE II

| Example | Heat Treatment | Acid Treatment | Reducing Heat Treatment | Article Interior |
|---|---|---|---|---|
| 1 | 300° C./hour to 900° C. Hold 4 hours | — | — | Beta-spodumene solid solution |
| 1 | 300° C./hour to 900° C. Hold 4 hours | None | 600° C./hour to 600° C. Hold 2 hours | Beta-spodumene solid solution |
| 2 | 300° C./hour to 750° C. Hold 12 hours | 0.5 minute in boiling concentrated $HNO_3$ | 300° C./hour to 525° C. Hold 3 hours | Glass |
| 3 | 300° C./hour to 800° C. Hold 16 hours | None | 300° C./hour to 550° C. Hold 2 hours | Glass |
| 4 | 300° C./hour to 750° C. Hold 12 hours | 0.5 minute in boiling concentrated $HNO_3$ | 300° C./hour to 525° C. Hold 3 hours | Glass |
| 5 | 500° C./hour to 800° C. Hold 16 hours | None | 600° C./hour to 525° C. Hold 2 hours | Glass |
| 6 | 300° C./hour to 825° C. | — | — | Glass |
| 6 | 300° C./hour to 825° C. Hold 16 hours | None | 600° C./hour to 700° C. Hold 4 hours | Glass |
| 7 | 300° C./hour to 800° C. Hold 6 hours | None | 300° C./hour to 525° C. Hold 5 hours | Glass |
| 8 | 300° C./hour to 700° C. 20° C./hour to 800° C. Hold 4 hours | 0.5 minute in boiling concentrated $HNO_3$ | 300° C./hour to 525° C. Hold 3 hours | Beta-spodumene solid solution |

| Example | Article Surface | Remanent Flux | Coercive Force | °25 | °200 | TCR | $\alpha$ | $\epsilon$ |
|---|---|---|---|---|---|---|---|---|
| 1 | $CoFe_2O_4$ | 0.065 | 689 | — | — | — | 0.9 | 0.8 |
| 1 | Co-Fe alloy | 0.289 | 580 | — | — | — | 0.94 | 0.36 |
| 2 | Co-Fe alloy | 0.053 | 909 | — | — | — | — | — |
| 3 | Co-Fe alloy | — | — | — | — | — | 0.9 | 0.46 |
| 4 | Co-Fe alloy | 0.081 | 768 | — | — | — | — | — |
| 5 | Ni-Fe alloy | — | — | — | — | — | 0.88 | 0.57 |
| 6 | $NiFe_2O_4$ | — | — | $1.8 \times 10^{10}$ | $2.5 \times 10^6$ | — | — | — |
| 6 | Ni-Fe alloy | 0.106 | 306 | 0.7 | 1.8 | 9000 | 0.90 | 0.66 |
| 7 | Ni-Fe alloy | — | — | 1.0 | 1.6 | 3400 | — | — |
| 8 | Ni-Fe alloy | 0.676 | 230 | 12.8 | — | — | — | — |

| Example | Heat Treatment | Acid Treatment | Reducing Heat Treatment | Article Interior |
|---|---|---|---|---|
| 8 | 300° C./hour to 750° C. 20° C./hour to 850° C. 100° C./hour to 1250° C. Hold 12 hours | — | — | Beta-spodumene solid solution |

TABLE II-continued

| | | | | |
|---|---|---|---|---|
| 8 | 300° C./hour to 750° C.<br>20° C./hour to 850° C.<br>1000° C./hour to 1250° C.<br>Hold 12 hours | None | 300° C./hour to 800° C.<br>Hold 5 hours | Beta-spodumene solid solution |
| 9 | 300° C./hour to 750° C.<br>25° C./hour to 1250° C.<br>Hold 6 hours | 0.5 minute in boiling concentrated HNO₃ | 600° C./hour to 600° C.<br>Hold 5 hours | Beta-spodumene solid solution |
| 9 | 300° C./hour to 750° C.<br>25° C./hour to 850° C.<br>100° C./hour to 1225° C.<br>Hold 8 hours | None | 300° C./hour to 650° C.<br>Hold 2 hours | Beta-spodumene solid solution |

| Example | Article Surface | Remanent Flux | Coercive Force | °25 | °200 | TCR | $\alpha$ | $\epsilon$ |
|---|---|---|---|---|---|---|---|---|
| 8 | NiFe₂O₄ | — | — | — | — | — | 0.80 | 0.82 |
| 8 | Ni-Fe alloy | — | — | 1.9 | 2.5 | 4800 | 0.85 | 0.67 |
| 9 | Ni-Fe alloy | 0.269 | 321 | — | — | — | — | — |
| 9 | Ni-Fe alloy | — | — | 7.3 | 9.8 | 1950 | — | — |

Several pertinent observations can be drawn from an inspection of Table II. Thus, Example 1 illustrates that the remanent magnetization of the ferromagnetic alloy is greater than that of the ferrimagnetic ferrite. The other examples demonstrate the wide range of magnetic properties that can be developed as a function of composition and heat treatment. Also, the coercive force of the Ni-Fe alloy appears to be considerably less than that of the Co-Fe alloy.

An efficient solar selective absorber for solar energy applications will have a high $\alpha$ and low $\epsilon$. For temperatures below 500° C., 98% of the thermal radiation occurs at wave lengths greater than two microns. Examples 1 and 8 manifest that the emittance of the alloy surface is less than that of the precursor ferrite surface. A comparison of the alloy surface emittances of Examples 1 and 3 with those of Examples 5, 6, and 8 indicates the Co-Fe alloy surfaces to have somewhat lower emittance than Ni-Fe alloy surfaces. Low emittance is conventionally associated with low electrical resistivity, i.e., high electrical conductivity, and is confined to semiconductors and metals.

The surface resistivity of the ferrite surfaces at room temperature is in excess of $2 \times 10^7$ ohms/square. The nickel ferrite surface of Example 6 has a surface resistivity of about $10^{10}$ ohms/square at 25° C. compared to about one ohm/square for the Ni-Fe alloy. The great decrease in electrical resistivity with temperature exhibited by the nickel ferrite surface of Example 6 contrasts sharply with the increase in electrical resistivity with temperature demonstrated by the alloy surfaces in Examples 6-9.

In an attempt to better understand the mechanism of formation of the ferrimagnetic compound ferrites of the type (Co,Ni)Fe₂O₄ and their subsequent reduction to ternary alloys, the following laboratory investigation was undertaken. Table III records several approximate glass compositions in like manner to Table I above, expressed in terms of parts by weight on the oxide basis. Again, the fluoride content is simply reported as AlF₃, the actual batch ingredient, and, because the total of the listed materials approaches 100, the compositions can be deemed to be in terms of weight percent for all practical purposes.

The batch ingredients were compounded, melted, and the melts shaped and annealed in accordance with the procedure outlined above with respect to the exemplary compositions of Table I.

TABLE III

| | 10 | 11 | 12 | 13 | 14 | 15 |
|---|---|---|---|---|---|---|
| SiO₂ | 63.0 | 63.0 | 60.3 | 60.3 | 60.5 | 60.5 |
| B₂O₃ | 3.0 | 3.0 | 2.8 | 2.8 | 2.8 | 2.8 |
| Al₂O₃ | 21.7 | 21.7 | 20.7 | 20.7 | 20.8 | 20.8 |
| AlF₃ | 2.4 | 2.4 | 2.3 | 2.3 | 2.3 | 2.3 |
| Li₂O | 4.2 | 4.2 | 4.1 | 4.1 | 4.1 | 4.1 |
| FeO | 3.3 | 2.0 | 3.1 | 2.0 | 3.1 | 2.0 |
| CoO | 1.0 | 1.6 | 0.9 | 1.5 | 0.9 | 1.5 |
| NiO | 1.0 | 1.6 | 0.9 | 1.5 | 0.9 | 1.5 |
| TiO₂ | — | — | 4.3 | 4.3 | 2.0 | 2.0 |
| ZrO₂ | — | — | — | — | 2.0 | 2.0 |
| As₂O₃ | 0.6 | 0.6 | 0.6 | 0.6 | 0.6 | 0.6 |

Examples 10 and 11 are stable glasses, whereas Examples 12 and 13 are TiO₂ nucleated and Examples 14 and 15 are TiO₂-ZrO₂ nucleated, thermally devitrifiable glasses, i.e., Examples 12-15 can be converted into glass-ceramic articles.

Table IV recites the heat treatment schedules in an air atmosphere applied to the glass articles of Table III to transform them into composite glass articles (Examples 10-11) and glass-ceramic articles (Examples 12-15) having very thin, integral surface layers containing crystallites of the type (Co,Ni)Fe₂O₄. A description of the visual appearance of each specimen and the crystal phases identified in the surface layer of each via X-ray diffraction analysis are also recorded.

Table IV further reports a firing of the composite articles in dry forming gas with no preliminary acid etch. A visual description of each sample, the crystal phases identified in the surface layer of each through X-ray diffraction analyses, and a measure of surface resistivity, $\sigma$, in ohms/square at 25° C. are also tabulated.

Finally, Table IV records a firing of the composite glass articles in dry forming gas preceded by an acid etch in 10% aqueous HNO₃ and illustrates the sharp reduction in surface resistivity resulting from the acid etch.

The presence of all three transition metal ions, i.e., iron, cobalt, and nickel, in the surface layer of each example was demonstrated by (a) firing each sample in air, (b) reducing each fired sample in forming gas, and (c) stripping the metallic surface so formed via etching in HCl. In this latter step the specimens were immersed into boiling aqueous 50% HCl for a period of time until the evolution of hydrogen gas ceased, normally a matter of about 10-20 seconds. Hydrogen is liberated according to the reaction

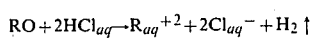

wherein R refers to $Co^{+2}$, $Fe^{+2}$, and $Ni^{+2}$. Cessation of hydrogen evolution indicates that the metallic phase has been completely removed from the surface layer. The specimens were thereafter lifted out of the etch bath to avoid attack of the glass or glass-ceramic substrate.

The etch bath was then evaporated to dryness and the residue subjected to emission spectrographic analysis. Metallic cobalt, iron, and nickel were determined to be present in each of the six samples. This result was confirmed via electron spectrometric analyses which also indicated the cobalt, iron, and nickel oxides or metallic species were present almost exclusively on the air-fired and reduced surfaces, respectively.

The air-fired surfaces of the stable glasses, viz., Examples 10-11, showed a weak ferrite crystal surface phase with Example 10 manifesting an additional trace amount of hematite. After firing in forming gas, Example 10 exhibited a weak diffraction pattern of an alloy having a γ-iron structure and elemental α-iron resulting from the reduction of hematite. After reduction, Example 11 demonstrated only a weak diffraction pattern of an alloy having a γ-iron structure.

The air-fired glass-ceramic specimens, viz., Examples 12-15, produced a strong diffraction pattern of ferrite crystals in the surface with beta-spodumene solid solution constituting the predominant crystal phase in the interior. Minor to trace amounts of rutile, $ZrTiO_4$, hematite, and a spinel phase were sometimes observed in the substrate. Firing the samples in forming gas reduced the surface ferrite crystals to an alloy exhibiting α-iron structure. A weak line in the diffraction pattern was observed at about 2.06 Å, thereby suggesting a trace amount of crystallinity having a γ-iron structure. However, the absence of other diffraction lines casts doubt on this assignment.

TABLE IV

| Example | Heat Treatment | Visual Description | Surface Crystallization | Interior Crystallization |
|---|---|---|---|---|
| 10 | 300° C./hour to 775° C. Hold 5 hours | Black brown | Ferrite, hematite | None |
| 10 | 300° C./hour to 775° C. Hold 5 hours | — | — | — |
| 10 | 300° C./hour to 775° C. Hold 5 hours | — | — | — |
| 11 | 300° C./hour to 775° C. Hold 5 hours | Metallic gray | Ferrite | None |
| 11 | 300° C./hour to 775° C. Hold 5 hours | — | — | — |
| 11 | 300° C./hour to 775° C. Hold 5 hours | — | — | — |
| 12 | 500° C./hour to 900° C. Hold 5 hours | Charcoal | Ferrite | Beta-spodumene solid solution |
| 12 | 500° C./hour to 900° C. Hold 16 hours | — | — | — |
| 12 | 500° C./hour to 900° C. Hold 16 hours | — | — | — |

| Example | Acid Heat Treatment | Reducing Heat Treatment | Visual Description | Surface Crystallization | σ |
|---|---|---|---|---|---|
| 10 | — | — | — | — | — |
| 10 | None | 600° C./hour to 550° C. Hold 5 hours | Charcoal | γ-alloy + α-iron | 1270 |
| 10 | 1 minute in boiling 10% $HNO_3$ | 600° C./hour to 550° C. Hold 5 hours | Charcoal | γ-alloy + α-iron | 79 |
| 11 | — | — | — | — | — |
| 11 | None | 600° C./hour to 550° C. Hold 5 hours | Gray | γ-alloy | 2063 |
| 11 | 1 minute in boiling 10% $HNO_3$ | 600° C./hour to 550° C. Hold 5 hours | Gray | γ-alloy | 230 |
| 12 | — | — | — | — | — |
| 12 | None | 600° C./hour to 550° C. Hold 5 hours | Charcoal | α-alloy | 12 |

| Example | Heat Treatment | Visual Description | Surface Crystallization | Interior Cyrstallization |
|---|---|---|---|---|
| 13 | 500° C./hour to 900° C. Hold 16 hours | Charcoal | Ferrite | Beta-spodumene solid solution |
| 13 | 500° C./hour to 900° C. Hold 16 hours | — | — | — |
| 13 | 500° C./hour to 900° C. Hold 16 hours | — | — | — |
| 14 | 500° C./hour to 900° C. Hold 16 hours | Charcoal | Ferrite | Beta-spodumene solid solution |
| 14 | 500° C./hour to 900° C. Hold 16 hours | — | — | — |
| 14 | 500° C./hour to 900° C. Hold 16 hours | — | — | — |
| 15 | 500° C./hour to 900° C. Hold 16 hours | Charcoal | Ferrite | Beta-spodumene solid solution |
| 15 | 500° C./hour to 900° C. Hold 16 hours | — | — | — |
| 15 | 500° C./hour to 900° C. Hold 16 hours | — | — | — |

| Example | Acid Heat Treatment | Reducing Heat Treatment | Visual Description | Surface Crystallization | σ |
|---|---|---|---|---|---|
| 13 | — | — | — | — | — |
| 13 | None | 600° C./hour to 550° C. Hold 5 hours | Charcoal | α-alloy | 15 |
| 14 | — | — | — | — | — |
| 14 | None | 600° C./hour to 550° C. | Charcoal | α-alloy | 15 |

TABLE IV-continued

| | | Hold 5 hours | | | |
|---|---|---|---|---|---|
| 15 | — | — | — | — | — |
| 15 | None | 600° C./hour to 550° C. Hold 5 hours | Charcoal | α-alloy | 21 |

To further indicate the surface character of the inventive products, additional glass specimens of Examples 10, 11, 12, and 15 were fired in air at 500° C./hour to 900° C. and held at that temperature for 16 hours. Each sample displayed the same visual appearance as set forth in Table IV above the demonstrated typical hysteresis loops, thereby indicating good ferrimagnetic properties resulting from the ferrite surface crystallization. The samples of Examples 10 and 11 were then immersed for one minute into boiling 10% $HNO_3$ and subsequently heated in dry forming gas at 600° C./hour to 550° C. and maintained therewithin for five hours. The specimens of Examples 12 and 15 were not subjected to a preliminary acid immersion but were immediately exposed to the dry forming gas treatment schedule. All four bodies exhibited typical hysteresis loops, thereby demonstrating ferromagnetic behavior as a result of the presence of alloy crystals in the surface.

The ferrite and alloy crystal structure assignments recorded above in Table IV were determined via the synthesis of appropriate materials. Thus, it has been shown that the reduction of cobalt ferrite yields a $CoFe_2$ alloy having a structure similar to that of α-iron. Also, it has been shown that the reduction of nickel ferrite results in a $NiFe_2$ alloy having a structure similar to that of γ-iron.

A ferrite having the stoichiometry $CoO.NiO.2Fe_2O_3$, i.e., $CoNiFe_4O_8$, was synthesized using (a) raw batch and (b) an equimolar mixture of previously prepared $CoFe_2O_4$ and $NiFe_2O_4$. After firing each mixture at 1400° C. for 16 hours, both gave an identical, simple ferrite diffraction pattern which could readily be distinguished from the diffraction pattern derived from an unsintered mixture of the two ferrites. Upon reduction in dry forming gas for five hours at 700° C., the compound ferrite was converted to the γ-iron alloy structure. Upon additional firing in forming gas for five hours at 750° C., the crystal structure was transformed into the α-iron form. This phenomenon indicates that the same ternary Co-Ni-Fe alloy can exist in both forms, which behavior is consistent with the findings for the alloy surfaces on glasses (γ-form) and glass-ceramics (α-form).

In summary, diffusion of iron, nickel, and cobalt to the surface can occur in glasses and glass-ceramics to produce a single compound ferrite surface phase. Upon reduction, this phase converts to a alloy having the γ-iron structure on low temperature, stable glasses and to an alloy having the α-iron structure on glass-ceramic surfaces. Table IV also points out that the surface resistivity of the glass articles is markedly lowered through the application of an acid etch prior to the reduction treatment.

I claim:

1. A composite glass article composed of a glassy body portion and a highly crystalline, integral surface layer not exceeding several thousand angstroms in thickness demonstrating ferromagnetic properties, said surface layer consisting essentially of cobalt-iron, nickel-iron, or cobalt-iron-nickel alloy crystals having diameters less than one micron dispersed within a glassy matrix, said composite glass article having an overall composition consisting essentially, in weight percent on the oxide basis, of about 1-17% $R_2O$, wherein $R_2O$ consists of $Li_2O$ and/or $Na_2O$ in the following indicated proportions of 2.5-5.5% $Li_2O$ and 1-16% $Na_2O$, 1-3.75% FeO, 0.75-5% RO, wherein RO consists of NiO and/or CoO in the following indicated proportions of 0.75-3% NiO and 0.75-4% CoO, 20-32% $Al_2O_3$, and 50-72% $SiO_2$.

2. A composite glass article according to claim 1 wherein said overall composition also contains up to 10% $P_2O_5$, and/or up to 3% $B_2O_3$, and/or up to 2% F.

3. A composite glass-ceramic article composed of an interior portion and an integral surface layer not exceeding several thousand angstroms in thickness demonstrating ferromagnetic properties, said interior portion being highly crystalline and consisting essentially of beta-spodumene solid solution crystals having compositions within the $Li_2O.Al_2O_3.n\ SiO_2$ system, wherein n will vary between about 3.5-8, dispersed within a glassy matrix, and said surface layer being highly crystalline and consisting essentially of cobalt-iron, nickel-iron, or cobalt-nickel-iron alloy crystals having diameters less than one micron dispersed within a glassy matrix, said glass-ceramic article having an overall composition in weight percent on the oxide basis of about 2.5-5.5% $Li_2O$, 16-27% $Al_2O_3$, 1-4% FeO, 0.5-3% NiO and/or 0.75-4% CoO, the sum of NiO+CoO not exceeding about 5%, 40-76% $SiO_2$, and 1.75-6% $TiO_2$ in those articles wherein beta-spodumene solid solution is the predominant crystal phase.

* * * * *

UNITED STATES PATENT AND TRADEMARK OFFICE
CERTIFICATE OF CORRECTION

PATENT NO. : 4,198,466
DATED : April 15, 1980
INVENTOR(S) : Richard F. Reade

It is certified that error appears in the above—identified patent and that said Letters Patent is hereby corrected as shown below:

Column 2, line 1, "utiizing" should read -- utilizing --.

Column 6, line 10, "furance" should read -- furnace --.

Column 8, line 3, "is" should read -- in --.

Signed and Sealed this

Twenty-fifth Day of November 1980

[SEAL]

Attest:

SIDNEY A. DIAMOND

Attesting Officer

Commissioner of Patents and Trademarks